United States Patent [19]
Darsow et al.

[11] 3,716,549
[45] Feb. 13, 1973

[54] PYRIDINE-BIS-(HYDROXYARYL ETHERS) AND DERIVATIVES THEREOF

[75] Inventors: Gerhard Darsow; Hermann Schnell, both of Krefeld-Verdingen, Germany

[73] Assignee: Bayer Aktiengesellschaft, Leverkusen, Germany

[22] Filed: June 29, 1970

[21] Appl. No.: 51,018

[30] Foreign Application Priority Data

July 10, 1969 Germany..................P 19 34 889.1

[52] U.S. Cl..................260/297 R, 260/47, 260/75, 260/294.8 F, 260/294.8 G, 260/297 B
[51] Int. Cl. .............................................C07d 31/30
[58] Field of Search ..................260/297 R

[56] References Cited

FOREIGN PATENTS OR APPLICATIONS 1,527,714   6/1968   France ................................260/297

OTHER PUBLICATIONS

Fieser and Fieser, Advanced Organic Chemistry, Reinhold Publishers, Pages 113, 306 (1961) QD 251 F5a C.4

*Primary Examiner*—Alan L. Rotman
*Attorney*—Connolly and Hutz

[57] ABSTRACT

Title products are described which are useful intermediates for the production of synthetic resins such as saturated and unsaturated polyester resins, polycarbonates and epoxy resins and which are prepared by reacting 2,6-dichloropyridine with a dialkali phenolate in the molar ratio of approximately 1:2 in the presence of a polar organic solvent at about 60° to about 180°C and acidifying the reaction mixture.

3 Claims, No Drawings

PYRIDINE-BIS-(HYDROXYARYL ETHERS) AND DERIVATIVES THEREOF

The subject matter of the invention is novel pyridine-bis-(hydroxyaryl ethers) of the formula I

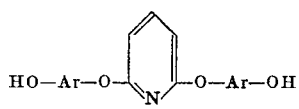

wherein Ar denotes phenylene, naphthylene, diphenylene or a polynuclear aromatic radial of the formula II

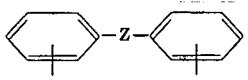

Z being a bivalent aliphatic, cycloaliphatic or araliphatic radical with one to eight C atoms or —O—, —S—, —SO—, —SO$_2$— or —CO—, and the aromatic nuclei may bear one to four alkyl or alkoxy groups with one to four C atoms or halogen atoms.

Examples of such compounds are: 2,6-bis-[(4-hydroxy)-phenoxy]-pyridine, 2,6-bis-[(3-hydroxy)-phenoxy]-pyridine, 2,6-bis[(4'-hydroxy)-diphenoxy]-pyridine, 2,6-bis-[4-(4-hydroxyphenyl-isopropyl)-phenoxy]-pyridine and 2,6-bis-[4-(4-hydroxyphenyl-sulphone)-phenoxy]-pyridine.

The novel pyridine-bis-(hydroxyaryl ethers) are crystalline or amorphous, colorless substances which melt between about 50°C and about 230°C and are soluble in solvents such as dimethyl sulphoxide, dimethyl formamide and dioxan. As dihydroxy compounds, they can serve, according to known processes, for the preparation of synthetic resins e.g. polycarbonates, epoxy resins and unsaturated polyester resins the properties of which are modified by the incorporation of the pyridine ring; they can readily be dyed e.g. with acid dyestuffs. Thus polycarbonates may be produced by reacting the pyridine-bis-hydroxyaryl ethers, optionally in admixture with other dehydric phenoles, with diphenyl carbonate in the melt or by reacting the corresponding alkali metal diphenolates with phosgen in a mixture of water and methylene chloride. Unsaturated polyesters may be prepared by reacting the pyridine-bis-hydroxyaryl ethers with, for example, maleic acid anhydride or by reacting aqueous solutions of the alkali metal diphenolates with unsaturated dicarboxylic acid dichlorides while epoxy resins may be obtained by reacting the pyridine-bis-hydroxyaryl ethers with epichlorhydrine and hardening the so obtained epoxides with acids or amines. Said resins per se are well known to be plastics very useful for many technical purposes in the plastic field.

The new substances can, according to the invention, be prepared by reacting 1 mole of 2,6-dichloropyridine with about 2 moles of a dialkali metal phenolate of the formula III

wherein
Me denotes an alkali metal in a polar organic solvent at temperatures between about 60°C and about 180°C, preferably between about 90° and about 160°C, and acidifying the reaction mixture.

Examples of dihydric phenols are: hydroquinone, resorcinol, dihydroxydiphenyls and dihydroxynaphthalenes as well as bis-phenols of the formula IV

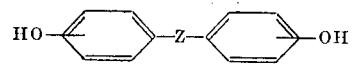

wherein
Z denotes a bivalent aliphatic, cycloaliphatic or araliphatic radical with one to eight C atoms or —O—, —S—, —SO—, —SO$_2$— or —CO—.

Examples of such bis-phenols are: bis-(4-hydroxyphenyl)-methane, 1,1-bis-(4-hydroxyphenyl)-cyclohexane, bis-(4-hydroxyphenyl)-phenylmethane, 4,4'-dihydroxydiphenyl ether, sulphide and sulphoxide, 4,4'-dihydroxybenzophenone, but particularly 2,2-bis-(4-hydroxyphenyl)-propane and 4,4'-dihydroxydiphenylsulphone.

Besides the hydroxyl groups, the aromatic nuclei may bear additional substituents, e.g. alkyl and alkoxy groups with one to four C atoms as well as halogen atoms, with the restriction that these substituents do not affect the reaction possibility of the hydroxyl groups by steric or other hindrance.

As cations for the diphenolates, those of the metals of the first main group of the periodic system are suitable. Preferably, the sodium and the potassium salts are used.

Of suitable polar organic solvents, there are mentioned for example diethyl sulphoxide, dimethylsulphone, diethylsulphone, diisopropylsulphone and tetramethylsulphone, but preferably dimethyl sulphoxide (DMSO).

The dialkali metal salts of the diphenols can be prepared according to known methods before the reaction proper by reacting the diphenol concerned in an inert organic solvent with the appropriate alkali metal, alkali metal alcoholate or alkali metal hydroxide, and subsequently distilling off the solvent with the alcohol or water which may have been liberated during the salt formation.

It is, however, simpler, and more expedient for the ensuing condensation reaction, to prepare in situ the dialkali metal phenolates concerned by causing the salt formation and the condensation reaction with 2,6-dichloropyridine in the presence of the polar solvent to proceed simultaneously or successively.

For this purpose, molar amounts of 2,6-dichloropyridine are dissolved with approximately two-fold molar amounts of diphenol in a sufficient amount of the polar solvent, the stoichiometric amount of alkali metal hydroxide is added in solid form or as concentrated aqueous solution and heating is effected under inert gas, e.g. nitrogen, gradually to reaction temperature. The reaction time is then, according to the reaction temperature and the water content of the mixture, about ½ - 8 hours. After cooling, the reaction mixture is mixed with acidified water, whereupon the reaction product precipitates and can be separated. Impurities can be removed if desired by re-precipitation, washing out or re-crystallization from a suitable solvent.

To attain high yields and to shorten the reaction time, it may be favorable, in the condensation of the dialkali metal phenolates with 2,6-dichloropyridine, to keep the water content of the reaction mixture low. For this purpose, the diphenol is dissolved in a sufficient amount of the polar solvent, the stoichiometric amount of alkali metal hydroxide is added in solid form or as concentrated aqueous solution, and the mixture is heated for some time, e.g. 2 – 6 hours, under inert gas to about 100° to about 150°C and, during this, the water present and the water liberated during phenolate formation is substantially distilled off from the mixture, expediently with the conjoint use of an entraining agent, such as benzene, toluene, xylene or chlorobenzene. The 2,6-dichloropyridine is subsequently added, whereupon the condensation reaction proper takes place by heating, e.g. for ½ – 5 hours, to the reaction temperatures mentioned.

Another simple method to substantially remove the water from the reaction mixture consists in dissolving the diphenol and the alkali metal hydroxide, with heating, in a sufficient amount of the polar organic solvent and subsequently, before the addition of 2,6-dichloropyridine, to distil off about 10–20 percent by volume of the polar solvent, expediently under vacuum. The water distils azeotropically with the partial amount of polar solvent from the reaction mixture. The 2,6-dichloropyridine is then added, whereupon, with further heating, condensation sets in.

EXAMPLE 1

2,6-bis-[4-(4-hydroxy-phenyl-isopropyl)-phenoxy]-pyridine

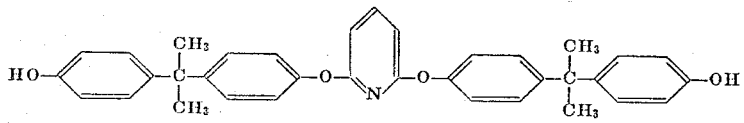

136.97 g (0.6 mole) 2,2-bis-(4-hydroxyphenyl)-propane and 48 g (1.2 moles) sodium hydroxide are dissolved in 500 ml dimethyl sulphoxide by heating under an inert gas atmosphere (nitrogen). 44.4 g (0.3 mole) 2,6-dichloropyridine are added to the clear solution at 60°C, and heating to 110°–130°C is effected for 6 hours. After cooling, the reaction product obtained is precipitated as snow-white powder by pouring into acidified water. After filtration, washing neutral and drying, a yield of 144 g is obtained.

Minor higher-condensed components can be removed by re-precipitation from dilute solution of sodium hydroxide. The product melts at 66°–68°C.

| Elementary analysis: | C | H | O | N | Molecular weight |
|---|---|---|---|---|---|
| $C_{35}H_{33}O_4N$ | | | | | |
| calc. | 78.0 | 6.3 | 12.1 | 2.1 | calc. 531.7 |
| found | 77.9 | 6.2 | 12.3 | 2.6 | found. 515 |

EXAMPLE 2

2,6-bis-[(4'-hydroxy)-diphenoxy]-pyridine 111.7 g (0.6 mole) 4,4'-dihydroxydiphenyl and 48.0 g (1.2 moles) NaOH, dissolved in 50 ml of water, are dissolved in 500 ml dimethyl sulphoxide, with stirring

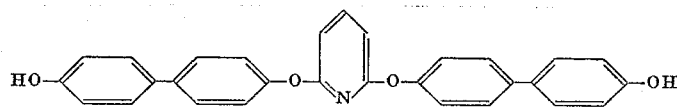

and heating to 80°C. 44.4 g (0.3 mole) 2,6-dichloropyridine are added to the clear solution at 40°C and the reaction mixture is heated to 130°–150°C for 7 hours. After cooling, the reaction product obtained is precipitated by pouring into acidified water. After filtration, reprecipitation once from dilute solution of sodium hydroxide, washing neutral and drying, a yield of 114 g is obtained.

If the product is colored, it can be recrystallized from a dimethyl formamide-water mixture or from a dioxan-water mixture. The white powder melts at 207°–211°C.

| Elementary analysis: | C | H | O | N | Molecular weight |
|---|---|---|---|---|---|
| $C_{29}H_{21}O_4N$ | | | | | |
| calc. | 77.9 | 4.7 | 14.3 | 3.1 | calc. 447.5 |
| found | 77.7 | 4.7 | 14.4 | 3.1 | found 449 |

What we claim is:

1. Pyridine-bis-hydroxyarylethers of the formula

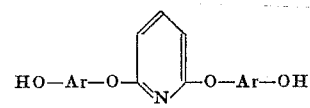

I wherein Ar is phenylene, naphthylene, diphenylene or a radical of the formula

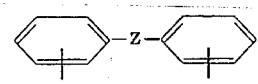

II wherein Z is alkylene, cycloalkylene or aralkylene having one to eight C atoms or —O—.

2. 2,6-bis-[4-(4-hydroxy-phenyl-isopropyl)-phenoxy]-pyridine.

3. 2,6-bis[(4'-hydroxy)-diphenoxy]-pyridine.

* * * * *